(12) United States Patent
Gaudern

(10) Patent No.: US 11,761,418 B2
(45) Date of Patent: Sep. 19, 2023

(54) WIND TURBINE BLADE WITH A GURNEY FLAP

(71) Applicant: POWER CURVE ApS, Aalborg (DK)

(72) Inventor: Nicholas Gaudern, Botley (GB)

(73) Assignee: POWER CURVE ApS, Aalborg (DK)

(*) Notice: Subject to any disclaimer, the term of this patent is extended or adjusted under 35 U.S.C. 154(b) by 0 days.

(21) Appl. No.: 17/671,069

(22) PCT Filed: Aug. 14, 2020

(86) PCT No.: PCT/EP2020/072875
§ 371 (c)(1),
(2) Date: Feb. 14, 2022

(87) PCT Pub. No.: WO2021/028573
PCT Pub. Date: Feb. 18, 2021

(65) Prior Publication Data
US 2023/0094997 A1 Mar. 30, 2023

(30) Foreign Application Priority Data

Aug. 14, 2019 (DK) .................................. 201970517

(51) Int. Cl.
*F03D 1/06* (2006.01)

(52) U.S. Cl.
CPC ...... *F03D 1/0633* (2013.01); *F05B 2240/301* (2013.01); *F05B 2240/304* (2020.08); *F05B 2240/305* (2020.08)

(58) Field of Classification Search
CPC .... F03D 1/0633; F03D 1/0641; F03D 1/0658; F05B 2240/301; F05B 2240/304; F05B 2240/305; Y02E 10/72
See application file for complete search history.

(56) References Cited

U.S. PATENT DOCUMENTS 7,059,833 B2 * 6/2006 Stiesdal .................. F03D 80/00
29/889.6
7,458,777 B2 * 12/2008 Herr ...................... F03D 1/0675
416/228

(Continued)

FOREIGN PATENT DOCUMENTS

CN 107084092 8/2017
CN 108716451 A 10/2018
(Continued)

OTHER PUBLICATIONS

International Search Report for PCT/EP2020/072875 dated Nov. 9, 2020.

*Primary Examiner* — J. Todd Newton
*Assistant Examiner* — Wayne A Lambert
(74) *Attorney, Agent, or Firm* — Bookoff McAndrews, PLLC

(57) ABSTRACT

Wind turbine blade having a length L, an airfoil with a chord C, and a first Gurney flap attached to the pressure or the suction surface of the airfoil near the trailing edge of the wind turbine blade. The first Gurney flap extends along at least 50% of the length of the outer ⅓rd of the wind turbine blade. By mounting the Gurney flap to the outer portion of the blade, the lift of the outer portion of the blade can be increased or decreased depending on the conditions in which the wind turbine is operating.

10 Claims, 2 Drawing Sheets

(56) References Cited

U.S. PATENT DOCUMENTS

| | | | |
|---|---|---|---|
| 8,834,127 B2 | 9/2014 | Giguere et al. | |
| 9,366,222 B2* | 6/2016 | Nielsen | F03D 1/0675 |
| 10,495,056 B2* | 12/2019 | Zamora Rodriguez | F03D 1/0633 |
| 2012/0063913 A1* | 3/2012 | Fugslang | F03D 1/0641 29/889.7 |
| 2012/0141269 A1* | 6/2012 | Giguere | F03D 7/0232 416/1 |
| 2012/0269644 A1* | 10/2012 | Enevoldsen | F03D 1/0641 416/235 |
| 2017/0082088 A1 | 3/2017 | Yarrbrough et al. | |
| 2017/0241400 A1* | 8/2017 | Whitehouse | F03D 1/0641 |
| 2018/0258912 A1* | 9/2018 | Herr | F03D 1/0633 |

FOREIGN PATENT DOCUMENTS

| | | |
|---|---|---|
| DK | 9500009 U | 4/1996 |
| EP | 1314885 A1 | 5/2003 |
| EP | 1845258 | 10/2007 |
| EP | 2022979 A1 | 2/2009 |
| EP | 2713044 B1 | 5/2017 |
| EP | 3204634 A1 | 8/2017 |
| EP | 3510276 A1 | 7/2019 |
| FR | 2475158 A1 * | 7/1981 |
| GB | 2526847 | 12/2015 |
| WO | WO 08113349 A2 | 9/2008 |
| WO | WO 11042528 A1 | 4/2011 |
| WO | WO 2011157849 | 12/2011 |
| WO | WO 13137716 A2 | 9/2013 |
| WO | WO 2014059989 | 4/2014 |
| WO | WO 16055076 A1 | 4/2016 |
| WO | WO 19138008 A1 | 7/2019 |

* cited by examiner

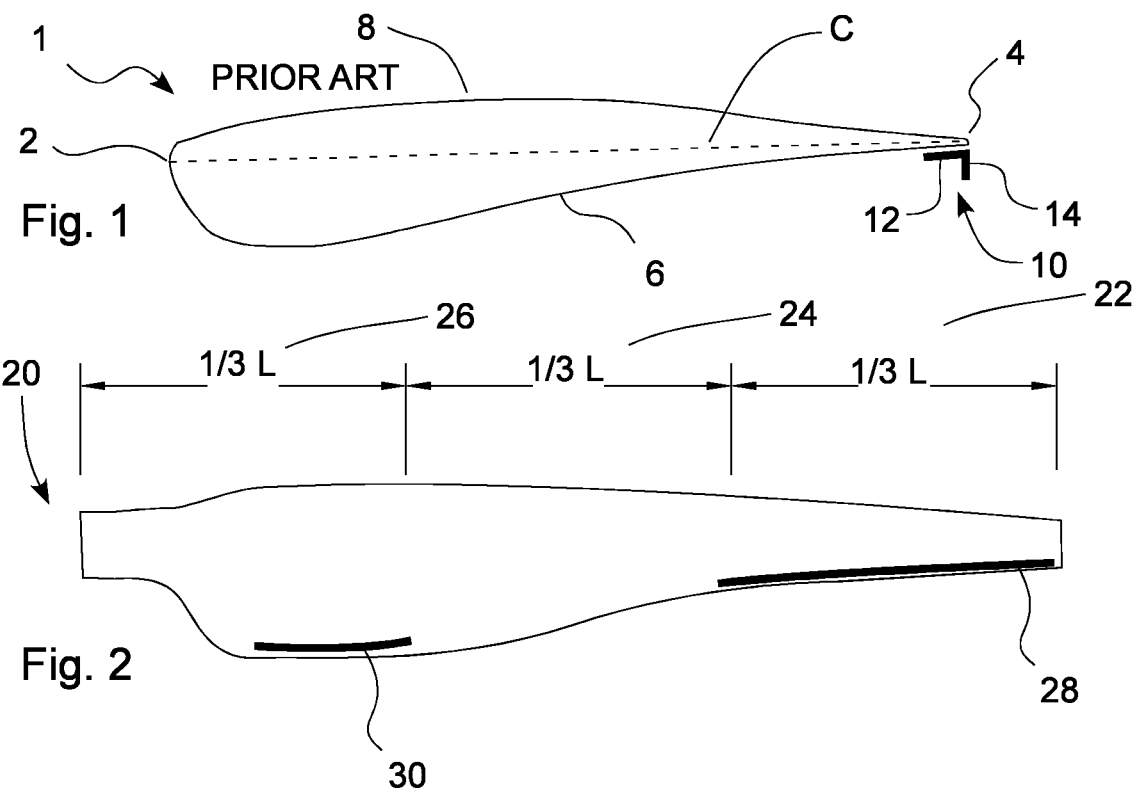
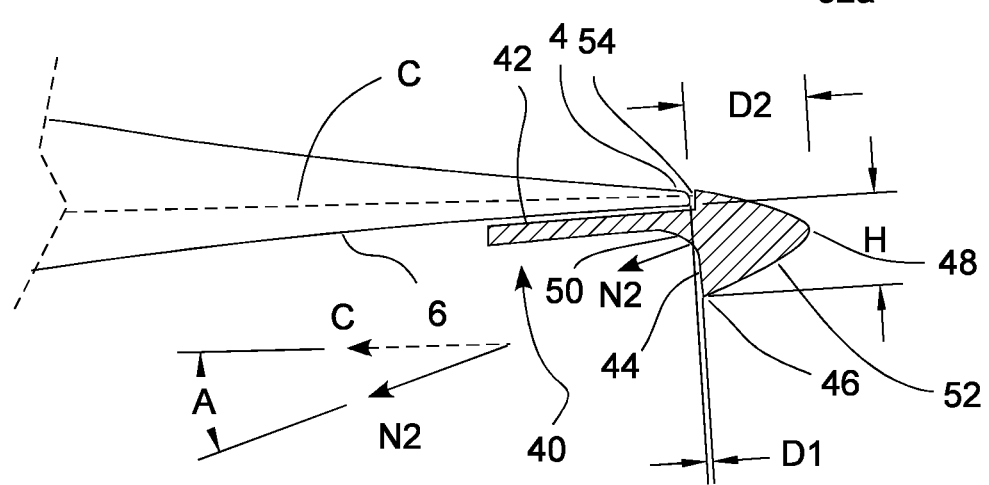
Fig. 1
Fig. 2
Fig. 3
Fig. 4

WIND TURBINE BLADE WITH A GURNEY FLAP

CROSS-REFERENCE TO RELATED APPLICATION(S)

This application is a Section 371 national stage application claiming priority to PCT/EP2020/072875, filed on Aug. 14, 2020, which claims priority to Denmark Application No. PA201970517, filed on Aug. 14, 2019.

FIELD OF THE INVENTION

The current invention relates to a wind turbine blade having a length L, an airfoil with a chord C and a Gurney flap attached near the trailing edge of the blade.

DESCRIPTION OF RELATED ART

Wind turbine blades are typically manufactured in batches of wind turbine blades with a standard shape and size across the batch. This is true even though it is well-known that the different blades will be used at different locations and with different environmental conditions. The use of batch manufacturing is due to the cost advantage of batch manufacturing blades. It is not typically feasible to build custom blades for each location.

However, in many cases, the performance or function of wind turbine blades can be improved via aerodynamic elements which can be added to the wind turbine blade after the wind turbine blade has been manufactured. Such aerodynamic elements could even be added after the wind turbine has been erected and has been in use for a period of time. Many different types of aerodynamic elements are already well-known in the art and have many different purposes and functions.

One example of an aerodynamic element is a strip of serrated teeth which can be attached to the trailing edge of a wind turbine blade as disclosed in EP1314885A1. This has the effect of reducing the noise generated by the wind turbine blade as it passes through the air. Another example is the use of vortex generators mounted on the suction side of the airfoil. These vortex generators are used to re-energise the boundary layer over the airfoil and thereby increase lift. Another example is controllable flaps which are attached along portions of the trailing edge of a wind turbine blade. Such controllable flaps can be used to change the airfoil under varying weather conditions. An example is disclosed in WO19138008 A1.

Another more simple device which has been used in certain cases is a Gurney flap. A Gurney flap is a small tab projecting from the trailing edge of a blade. It is usually applied on the pressure-side surface of the airfoil and typically projects perpendicularly away from the surface at a distance of 1% to 4% of the local blade chord. A Gurney flap works by increasing the streamline curvature around the airfoil—effectively increasing the "camber" of the airfoil section. Gurney flaps were first used in car racing to increase downforce generated by wings mounted on the car.

Gurney flaps have previously been used on wind turbine blades. Some examples are disclosed in EP3510276 A1, WO11042528 A1, EP2713044 B1, WO13137716 A2, WO16055076 A1, U.S. Pat. No. 8,834,127 B2, WO08113349 A2, WO2014059989, CN107084092, GB2526847, EP1845258, DK9500009U and WO 2011157849.

Gurney flaps have the advantage of increasing lift (which generates more power from the wind turbine), but at the same time Gurney flaps also increase drag which his not desired. Hence, in the prior art, Gurney flaps have typically been placed near the root of the wind turbine blade to generate extra lift in the inner third of the span of the wind turbine blade. This placement is used since this is the area where the wind turbine blade experiences the slowest incident flow speed and where increased drag will have the smallest effect. Other prior art Gurney flap arrangements have proposed the use of Gurney flaps mounted on flexible extension elements which place the Gurney flap at a distance behind the trailing edge of the wind turbine. These flexible extension elements will allow the Gurney flaps to bend as the blade speed is increased to reduce the drag effect of the Gurney flaps; however, these solutions are more difficult to apply and are more likely to fall off over time due to the large bending forces involved.

SUMMARY OF THE INVENTION

It is therefore a first aspect of the current invention to provide a Gurney flap arrangement which can be applied to a wind turbine blade to overcome the drawbacks of the prior art solutions.

This aspect is provided at least in part by a first Gurney flap attached to the pressure or the suction surface of the airfoil near the trailing edge of the wind turbine blade, said first Gurney flap extending along at least 50% of the length of the outer $\frac{1}{3}^{rd}$ of the wind turbine blade.

The inventor has surprisingly found that Gurney flaps placed in a fixed location along the outer one third of the blade can have a significant effect on lift while not increasing the drag significantly. Hence the lift to drag ratio of the wind turbine blade is increased with the use of Gurney flaps on the pressure surface of the outer portion of the wind turbine blade or decreased with the use of Gurney flaps on the suction surface of the outer portion of the wind turbine blade. This is contrary to the established theory of wind turbine blade design where it is desired to increase the lift of the inner most portion of the wind turbine blade while decreasing the drag of the outer portion of the wind turbine blade.

Furthermore, the inventor has surprisingly found that Gurney flaps placed on the suction side of the outer portion of the blade can have a positive effect on the overall wind turbine performance even though the lift of the outer portion of the blade is reduced. By reducing the lift on the outer portion of the blade, the bending forces on the blade can be reduced.

In one embodiment, the first Gurney flap is comprised of multiple sections, the length of said sections in total covering at least 50% of the length of the outer $\frac{1}{3}^{rd}$ of the wind turbine blade. In one embodiment, the first Gurney flap extends along at least 60%, at least 70% or at least 80% of the outer $\frac{1}{3}^{rd}$ of the wind turbine blade.

In one embodiment, the wind turbine blade further comprises a second Gurney flap attached to the pressure or the suction surface of the airfoil near the trailing edge of the wind turbine blade, said second Gurney flap extending along at least 50% of the length of the inner $\frac{1}{3}^{rd}$ of the wind turbine blade. In many cases a combination of an outer (first) Gurney flap and an inner (second) Gurney flap will have a positive effect.

In one embodiment, the second Gurney flap is comprised of multiple sections, said sections in total covering at least 50% of the length of the inner $\frac{1}{3}^{rd}$ of the wind turbine blade.

In one embodiment, the second Gurney flap extends along at least 60%, at least 70% or at least 80% of the inner $1/3^{rd}$ of the wind turbine blade.

In one embodiment, the first Gurney flap comprises a first surface which is attached to the pressure or the suction side of the wind turbine blade and a second surface facing the direction of travel of the wind turbine blade and where, in a perpendicular cross section through the first Gurney flap, said first Gurney flap is arranged such that the average normal vector of the second surface forms an angle A of +1-30 degrees to the local chord of the airfoil and in that the height H of the first Gurney flap is greater than 0.1% and less than 0.5% of the length of the local chord of the airfoil. In this way, a Gurney flap is provided which has a significant effect on the lift of the blade, while not having a significant effect on the drag. Hence, the lift to drag ratio of the blade can be optimized.

According to this specification, the term "perpendicular cross section" should be understood as a cross section which is taken on a plane which is perpendicular to the longitudinal extension of the object through which the cross section is taken.

According to this specification, the height H of the Gurney flap is defined as the distance, in a perpendicular cross section taken through the Gurney flap, from the first surface of the Gurney flap to the point of the second surface of the Gurney flap which is furthest from the first surface in a direction perpendicular to the local chord of the airfoil.

According to this specification, the term "local chord" should be understood as the chord of the airfoil at the location of the cross section.

In one embodiment, the height H of the first Gurney flap is greater than 0.15% or greater than 0.2% of the length of the local chord of the airfoil. In one embodiment, the height H of the first Gurney flap is less than 0.45%, less than 0.4% or less than 0.35% of the length of the local chord of the airfoil.

In one embodiment, the first surface is attached to the pressure or suction surface of the wind turbine blade via an adhesive.

In one embodiment, the height H of the first Gurney flap, is constant over the length of the first Gurney flap along the longitudinal extension of the first Gurney flap. In one embodiment, the height H, is variable over the length of the Gurney flap along the longitudinal extension of the Gurney flap and decreases from an inner portion to an outer portion of the first Gurney flap.

In one embodiment, the first Gurney flap comprises at least two, at least three, or at least four sections along the longitudinal extension of the first Gurney flap, each section having a height H which is constant over the length of the section. In one embodiment, the height H of at least two sections are different. In one embodiment, the height H of an inner section is greater than the height H of an outer section.

In one embodiment, the second Gurney flap comprises a first surface which is attached to the pressure or the suction side of the wind turbine blade and a second surface facing in the direction of travel of the wind turbine blade, and in that, in a perpendicular cross section through the second Gurney flap, said second Gurney flap is arranged such that the average normal vector of the second surface forms an angle A of +1-30 degrees to the local chord of the airfoil and in that the height H of the second Gurney flap is greater than 0.5% and less than 4% of the length of the local chord of the airfoil. In this case, the use of two different sized gurney flaps, a small one mounted on the outer portion and a larger one mounted on the inner portion has a positive effect on the overall blade performance.

In one embodiment, the first Gurney flap is mounted to the suction surface and the second Gurney flap is mounted to the pressure surface of the wind turbine blade.

In one embodiment, the height H of the second Gurney flap is less than 3.5%, less than 3% or less than 2.5% of the local chord of the airfoil. In one embodiment, the height of the second Gurney flap is greater than 1.5% or greater than 2% of the local chord of the airfoil.

In one embodiment, in a perpendicular cross section through the first Gurney flap and airfoil, a dimension D1, along a direction which is parallel to the local chord (C) of the airfoil, from the trailing edge of the wind turbine blade to the point of the second surface which is located furthest from the first surface of the first Gurney flap in a direction perpendicular to the local chord (C) of the airfoil is less than 0.5% of the length of the local chord of the airfoil. This could also be called the position of the max height of the Gurney flap. By positioning the position of max height close to the trailing edge, the construction of the Gurney flap can be made simpler since the forces acting on the Gurney flap will be lower than in a case where the Gurney flap is located farther behind the trailing edge.

In one embodiment, in a perpendicular cross section through the first Gurney flap and airfoil, the dimension D2 which the Gurney flap extends past the trailing edge along a direction parallel to the local chord of the airfoil is less than 1% of the length of the local chord of the airfoil. In one embodiment, the overhang of the Gurney flap with regards to the trailing edge of the airfoil is less than 1% of the length of the local chord of the airfoil. In this case, the Gurney flap affects the lift/drag of the blade, but does not significantly increase the chord length of the blade, which is beneficial for minimising extreme loads.

In one embodiment, the first Gurney flap comprises a first flange which is attached to the pressure or suction surface of the blade and a second flange which extends from the first flange at an angle of between 60 and 120 degrees to the first flange. This is a very simple and well-known arrangement of a Gurney flap.

In one embodiment, in a perpendicular cross section through the first Gurney flap, the second surface of the first Gurney flap comprises a curved portion which transitions between a portion having a normal vector which is essentially perpendicular to the local chord of the airfoil, to a portion having a normal vector which forms an angle to the local chord of the airfoil, said angle being between +/−30 degrees, +/−15 degrees or essentially 0 degrees. This is in contrast to the more simple form of Gurney flap comprising two simple flanges.

In one embodiment, the first Gurney flap has a third surface which is attached to the trailing edge of the wind turbine blade, said third surface forming an angle of between 60 and 120 degrees to the local chord of the airfoil. In this way, the Gurney flap can be fixed both to the pressure/suction surface and to the trailing edge. This increases the connection between the Gurney flap and the blade, as well as protecting the trailing edge.

In one embodiment, the first Gurney flap comprises a rear portion which is arranged behind the trailing edge of the wind turbine blade, and where the dimension of the rear portion of the first Gurney flap perpendicular to the local chord of the airfoil tapers in the direction away from the airfoil. In this way, the drag of the Gurney flap can be reduced. In one embodiment, the rear portion of the first Gurney flap tapers to a point.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

FIG. 1 schematically shows a typical cross section of a wind turbine blade with a Gurney flap attached to the pressure surface near the trailing edge.

FIG. 2 schematically shows a bottom view of a wind turbine blade showing the pressure surface of the blade and the placement of Gurney flaps according to one embodiment of the current invention.

FIG. 3 schematically shows a bottom view of a wind turbine blade showing the pressure surface of the blade and the placement of Gurney flaps according to another embodiment of the current invention.

FIG. 4 schematically shows a cross section view through one embodiment of a Gurney flap.

DETAILED DESCRIPTION OF THE EMBODIMENTS

Figure 5:
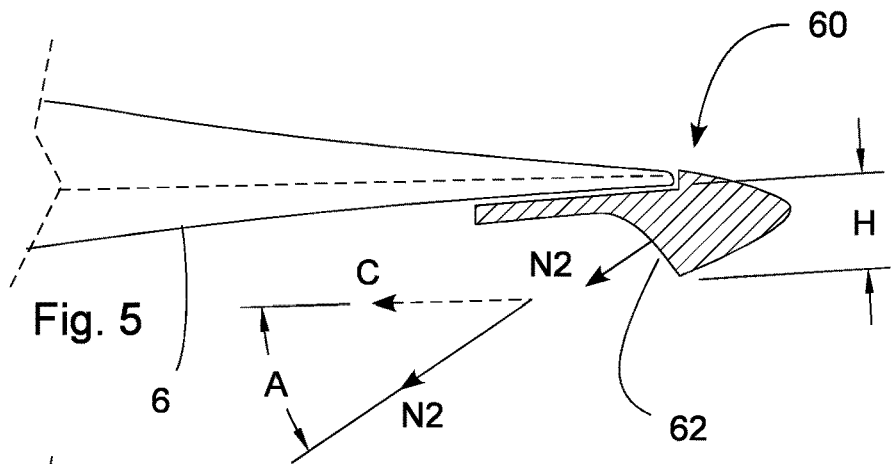
FIG. 5 schematically shows a cross section view through another embodiment of a Gurney flap.

FIG. 1 shows a cross sectional view of a traditional airfoil 1 of a wind turbine blade. The airfoil has a leading edge 2, a trailing edge 4, a chord C connecting the leading edge 2 and the trailing edge, a pressure surface 6 and a suction surface 8. The detailed description of how an airfoil works will not be discussed here as it is expected that the person skilled in the art will be familiar with the theory behind airfoils.

On the pressure surface 6, near the trailing edge 4, a typical Gurney flap 10 is placed. This is a well-known positioning of a Gurney flap. The Gurney flap in this embodiment comprises a first flange 12 which is attached to the pressure surface of the blade and a second flange 14 which extends perpendicularly to the first flange and away from the pressure surface. Within the scope of the current invention, the Gurney flap could be placed at different locations and could be formed in different ways.

FIG. 2 schematically shows a bottom view of a wind turbine blade 20 and shows the pressure surface 6 of the blade. For the sake of this specification the blade is split into three areas, an outer $\frac{1}{3}^{rd}$ portion 22, a middle $\frac{1}{3}^{rd}$ portion 24 and an inner $\frac{1}{3}^{rd}$ portion 26. In this specification, the placement of the Gurney flaps are described with respect to the inner $\frac{1}{3}^{rd}$ or the outer $\frac{1}{3}^{rd}$, however, the person skilled in the art should understand that this is a simplification for the sake of understanding and it does not have to be exactly $\frac{1}{3}^{rd}$.

In the embodiment of FIG. 2, the blade has a first Gurney flap 28 mounted on the pressure surface near the trailing edge and on the outer $\frac{1}{3}^{rd}$ of the blade.

The first Gurney flap extends along close to 100% of the length of the outer $\frac{1}{3}^{rd}$ of the blade. The blade also has a second Gurney flap 30 mounted on the pressure surface near the trailing edge but on the inner $\frac{1}{3}^{rd}$ of the blade. The second Gurney flap extends along about 50% of the length of the inner $\frac{1}{3}^{rd}$ of the blade in this embodiment. The first Gurney flap is arranged with a height which is between 0.2% and 0.5% of the local chord length while the second Gurney flap is arranged with a height which is between 0.5% and 4%. In this way, the first Gurney flap will have a smaller effect on the lift, due to its smaller size, but will also have less drag than the second Gurney flap.

As the chord of the blade decreases towards the tip of the blade, the height of the Gurney flap needs to be chosen with care. If the Gurney flap is too high, the drag created by the Gurney flap will be too high. Hence, the height of the Gurney flap can be chosen to be constant over the entire length of the Gurney flap, but at a height which is a bit too high in some areas and a bit too low in other areas. Or the height of the Gurney flap can be made to be tapering, so that the height of the Gurney flap decreases towards the tip of the blade. Depending on the manufacturing technique of the Gurney flap, it can in certain cases be difficult or expensive to manufacture a Gurney flap with a tapering height. In such cases, a number of different Gurney flap sections can be placed in line along the trailing edge to form a long Gurney flap. In this case, each Gurney flap section can have a different height, so that the height of the sections which are placed further out on the blade have a smaller height that the sections closer to the inner portion of the blade.

FIG. 3 shows an alternative wind turbine blade, again from the bottom showing the pressure surface. In this case there is a Gurney flap 32 mounted to the outer portion of the wind turbine blade. However, in this case, the Gurney flap has been split into an inner portion 32a and an outer portion 32b. The inner portion 32a has a greater height than the outer portion 32b. It should be noted that the exact height chosen for the Gurney flap will be dependent on the actual blade and the environmental conditions that blade is going to be operating in. Therefore, in the current specification, no specific dimensions are provided as the person skilled in the art will be able to provide a suitable form and height based on the actual case. However, in the current embodiment, both inner and outer portions 32a, 32b of the Gurney flap 32 have a height which is less than 0.5% of the local chord length of the blade.

FIG. 4 shows a schematic cross section of an embodiment of a Gurney flap 40 which is different from the prior art type Gurney flaps. In this embodiment, the Gurney flap 40 has a first surface 42 which is attached to the pressure surface 6 of the airfoil. The first surface will be attached to the pressure surface 6 of the airfoil via a suitable adhesive. The Gurney flap also has a second surface 44 which is arranged facing the direction of travel of the blade. In this case, the second surface 44 is arranged as a surface with a curvature which starts with a normal vector which is roughly perpendicular to the chord line and ends with a normal vector which is roughly parallel to the chord line.

A perpendicular cross section taken through the Gurney flap shows that the second surface has an average normal vector N2, which forms an angle A to the chord line C. The height of the Gurney flap is shown with the dimension H. The point where the height is measured is the point 46 of the second surface which is the farthest away from the chord line of the airfoil in a direction perpendicular to the chord line. The point 46 which is farthest from the chord line of the airfoil could be called the point of max height.

The distance from this point to the trailing edge in a direction which is parallel to the chord is shown by D1. In some of the prior art documents, the distance D1 is quite large with respect to the chord of the airfoil. This puts the effect of the Gurney flap quite far behind the trailing edge and requires a very strong connection between the Gurney flap and the blade due to the bending forces.

The distance from the trailing edge 4 of the blade to the rear tip 48 of the gurney flap along a direction which is parallel to the chord C is shown by the dimension D2.

In this embodiment, it could be said that the difference between this Gurney flap 40 and the simple Gurney flap 10 shown in FIG. 1, is that a fillet 50 has been applied between the two flanges 12,14 of the simple Gurney flap 10 and the rear surface 52 of the perpendicular flange 14 has been extended to provide a tapering surface. The effect of the fillet is to increase the lift. Without being bound to any theory, it is believed that this is due to the flow not stagnating as much in the corner between the flanges, and thereby giving a smoother flow around the gurney flap. However, the fillet in certain cases also seems to increase the drag of the Gurney flap. The tapered rear surface 52 acts to reduce the drag of the Gurney flap, without significantly reducing the lift.

The Gurney flap 40 also has a third surface 54 which faces in the direction of travel of the blade and is attached to the trailing edge 4 of the blade. This third surface increases the contact area between the blade and the Gurney flap and thereby increases the surface area which can be attached to the blade. This increases the holding force and ensures that the Gurney flap can be firmly attached to the blade. Adhesive can be applied to the first surface and the third surface so that the Gurney flap is firmly attached both to the pressure side of the blade as well as to the trailing edge.

FIG. 5 shows another embodiment of a Gurney flap 60. This Gurney flap 60 is very similar to the Gurney flap 40 of FIG. 4 and will not be described in detail. The main difference between this Gurney flap 60 and the Gurney flap 40 of FIG. 4 is that the angle A between the normal vector N2 of the second surface 62 of this Gurney flap 60 and the chord line C is greater since the second surface 62 is not as steep.

Figure 6:
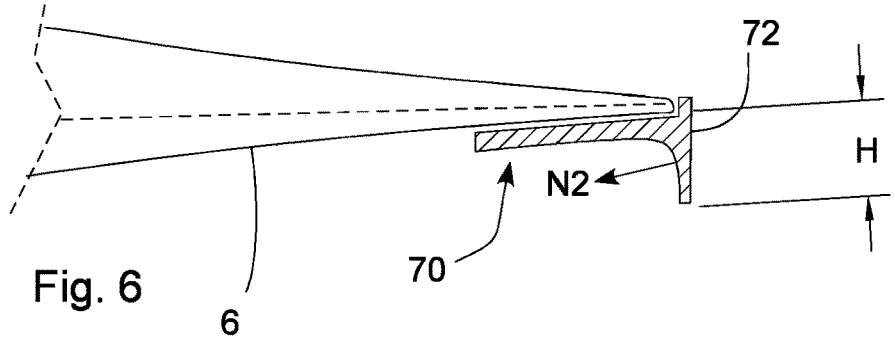
FIG. 6 schematically shows a cross section view through another embodiment of a Gurney flap.

FIG. 6 shows another embodiment of a Gurney flap 70. This Gurney flap 70 is very similar to the Gurney flap 40 of FIG. 4 and will not be described in detail. The main difference between this Gurney flap 70 and the Gurney flap 40 of FIG. 4 is that in this Gurney flap 70, the rear surface 72 of the Gurney flap is flat instead of tapered as in the Gurney flaps 40,60 of FIGS. 4 and 5. This is a much simpler Gurney flap and one which is lighter and has less material, but the drag will be increased with respect to the Gurney flap of FIG. 5.

Figure 7:
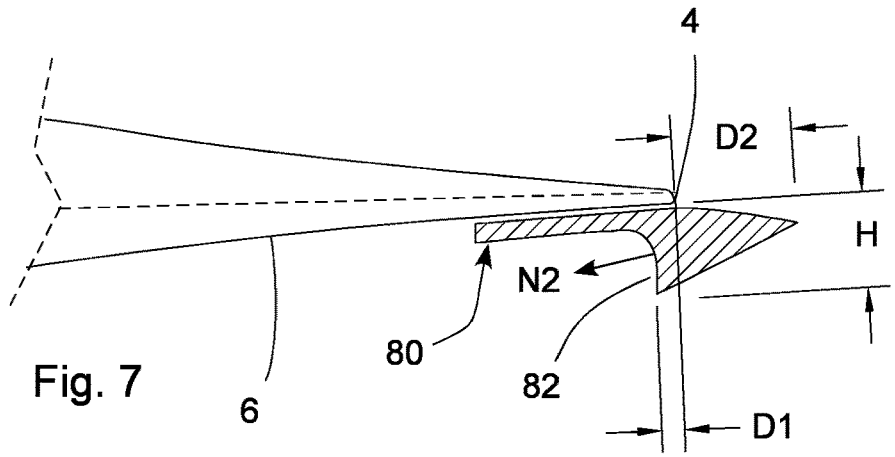
FIG. 7 schematically shows a cross section view through another embodiment of a Gurney flap.

FIG. 7 shows another embodiment of a Gurney flap 80. This Gurney flap 80 is very similar to the Gurney flap 40 of FIG. 4 and will not be described in detail. The main difference between this Gurney flap 80 and the Gurney flap 40 of FIG. 4 is that this Gurney flap 80 is only attached to the pressure surface of the blade and does not have the third surface 54 which was attached to the trailing edge 4 of the blade in the embodiment of FIG. 4. Another difference between this embodiment 80 and the embodiment of FIG. 4 is that the second surface 82 is placed further forward in the direction of the blade travel when compared to the embodiment of FIG. 4. As such, the distance D1 is greater than, and in an opposite direction to the embodiment of FIG. 4.

Figure 8:
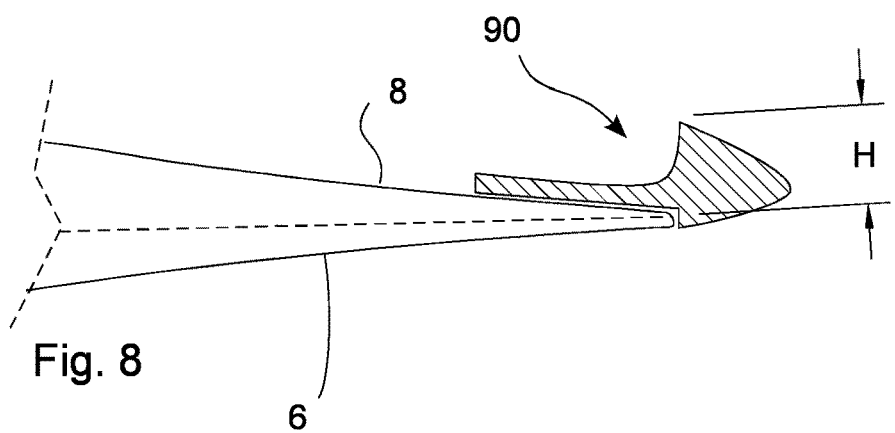
FIG. 8 schematically shows a cross section view through another embodiment of a Gurney flap.

FIG. 8 shows another embodiment of a Gurney flap 90. This Gurney flap 90 is very similar to the Gurney flap 40 of FIG. 4 and will not be described in detail. The main difference between this Gurney flap 90 and the Gurney flap 40 of FIG. 4 is that this Gurney flap 90, has been attached to the suction side 8 of the blade. In this way, the lift of the blade will be reduced at those locations where the Gurney flap is attached to the suction side. By placing the Gurney flap on the suction side of the blade towards the outer portion of the blade, the lift of the outer portion of the blade will be reduced. This will have the effect of reducing the bending moment on the blade. This can have a positive effect on the service life of the blade.

It can be noted that the current specification has disclosed a number of embodiments having different features. It can be understood by the person skilled in the art that these features can be combined as needed.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific manufacturing procedure have not been described in detail since it is maintained that the person skilled in the art would be able to find suitable materials and suitable processes to manufacture the device according to the current invention. In one example, a Gurney flap is manufactured as an injection moulded component. In one example, a Gurney flap is manufactured via an extrusion process. In one example, a Gurney flap is manufactured from a plastic material. In one example, a Gurney flap is manufactured from a fibre reinforced plastic material.

The invention claimed is:

1. Wind turbine blade having a length (L), an airfoil with a local chord (C), and a first Gurney flap attached to a pressure or a suction surface of the airfoil near a trailing edge of the wind turbine blade, said first Gurney flap extending along at least 50% of a length of an outer $\frac{1}{3}^{rd}$ of the wind turbine blade; and the first Gurney flap comprises a first surface which is attached to the pressure or the suction side of the wind turbine blade and a second surface facing a direction of travel of the wind turbine blade, and in that, in a perpendicular cross section through the first Gurney flap, said first Gurney flap is arranged such that an average normal vector of the second surface forms an angle (A) ranging from positive 30 degrees to negative 30 degrees to the local chord (C) of the airfoil and in that a height (H) of the first Gurney flap is greater than 0.1% and less than 0.5% of a length of the local chord of the airfoil;

wherein the perpendicular cross section is through the first Gurney flap and airfoil, a dimension (D1), along a direction which is parallel to the local chord (C) of the airfoil, from the trailing edge of the wind turbine blade to a point of the second surface which is located furthest from the first surface of the first Gurney flap in a direction perpendicular to the local chord of the airfoil is less than 0.5% of the length of the local chord of the airfoil.

2. Wind turbine blade according to claim 1, characterized in that the wind turbine blade further comprises a second Gurney flap attached to the pressure or the suction surface of the airfoil near the trailing edge of the wind turbine blade, said second Gurney flap extending along at least 50% of a length of an inner $\frac{1}{3}^{rd}$ of the wind turbine blade.

3. Wind turbine blade according to claim 2, characterized in that the second Gurney flap comprises a first surface which is attached to the pressure or the suction side of the wind turbine blade and a second surface facing in the direction of travel of the wind turbine blade, and in that, in a perpendicular cross section through the second Gurney flap, said second Gurney flap is arranged such that the average normal vector of the second surface forms an angle (A) ranging from positive 30 degrees to negative 30 degrees to the local chord of the airfoil and in that a height (H) of the second Gurney flap is greater than 0.5% and less than 4% of the length of the local chord of the airfoil.

4. Wind turbine blade according to claim 1, characterized in that, in a perpendicular cross section through the first Gurney flap and airfoil, a dimension (D2) which the Gurney flap extends past the trailing edge along a direction parallel to the local chord of the airfoil is less than 1% of the length of the local chord of the airfoil.

5. Wind turbine blade according to claim 1, characterized in that, in the perpendicular cross section through the first Gurney flap, the second surface of the first Gurney flap comprises a curved portion which transitions between a portion having a normal vector which is essentially perpendicular to the local chord of the airfoil, to a portion having a normal vector which is essentially parallel to the local chord of the airfoil.

6. Wind turbine blade according to claim 1, characterized in that the first Gurney flap has a third surface which is attached to the trailing edge of the wind turbine blade, said third surface forming an angle of between 60 and 120 degrees to the local chord of the airfoil.

7. Wind turbine blade according to claim 1, characterized in that the first Gurney flap comprises a rear portion which is arranged behind the trailing edge of the wind turbine blade, and in that a dimension of the rear portion of the first Gurney flap perpendicular to the local chord of the airfoil tapers in a direction away from the airfoil.

8. Wind turbine blade according to claim 7, characterized in that the rear portion of the first Gurney flap tapers to a point.

9. Wind turbine blade according to claim 2, characterized in that the first Gurney flap is attached to the suction surface of the wind turbine blade.

10. Wind turbine blade according to claim 2, characterized in that the second Gurney flap is attached to the pressure surface of the wind turbine blade.

* * * * *